United States Patent
Lillemann et al.

(10) Patent No.: US 6,519,661 B1
(45) Date of Patent: Feb. 11, 2003

(54) METHOD FOR RECORDING DATA IN A TELECOMMUNICATIONS SWITCHING CENTER

(75) Inventors: Rein Lillemann, Unterhaching (DE); Ulrich Schuon, Puchhheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/296,117

(22) Filed: Apr. 21, 1999

(30) Foreign Application Priority Data

Apr. 21, 1998 (DE) .......................... 198 17 793

(51) Int. Cl.[7] .......................... G06F 13/00; G06F 13/14
(52) U.S. Cl. ............... 710/52; 710/53; 710/54; 710/58; 710/60; 709/6
(58) Field of Search ............ 710/52, 53, 54, 710/58, 60; 709/6

(56) References Cited

U.S. PATENT DOCUMENTS

| | | | | |
|---|---|---|---|---|
| 5,163,045 A | * | 11/1992 | Caram et al. .............. | 370/60.1 |
| 5,809,012 A | * | 9/1998 | Takase et al. ............... | 370/229 |
| 5,872,930 A | * | 2/1999 | Masters et al. .......... | 395/200.53 |
| 6,137,798 A | * | 10/2000 | Nishihara et al. ........... | 370/392 |
| 6,205,145 B1 | * | 3/2001 | Yamazaki ................... | 370/395 |

* cited by examiner

*Primary Examiner*—Jeffrey Gaffin
*Assistant Examiner*—Rehana Perveen
(74) *Attorney, Agent, or Firm*—Schiff Hardin & Waite

(57) ABSTRACT

A method for recording data about internal and external messages in a software system which is, in particular, part of a digital telecommunications switching center. Within a software system which, as a rule, comprises a number of components, the components interchange internal messages with one another and/or receive/transmit external messages to and from the outside world via an interface. Such messages are registered at so-called trace points (TP1, ..., TPn) defined in the software system, and are transmitted without any delay to a FIFO buffer store (ZS), without any acknowledgment from the receiver, and are stored there until they are read after a request from a data-processing system (PC), which is connected to the software system, for the purpose of processing them further.

15 Claims, 2 Drawing Sheets

METHOD FOR RECORDING DATA IN A TELECOMMUNICATIONS SWITCHING CENTER

BACKGROUND OF THE INVENTION

The invention relates to a method for recording data about internal and external messages in a software system which is, in particular, part of a digital telecommunications switching center.

One such method is based on the following:

In a digital telecommunications switching center, the current states of adjacent assemblies are monitored, for example, with the aid of a software system which is stored on a so-called controller assembly, and is preferably composed of a plurality of components. This is achieved, in particular, in that data relating to external messages which are transmitted from the adjacent assemblies via an interface to the controller assembly, as well as internal messages which are interchanged between the said components, are recorded in the software system. The said external messages primarily contain information about the various states of the adjacent assembly, while the internal messages predominantly initiate actions which have a controlling influence on the adjacent assemblies.

In previously known software systems of this type, the recorded data relating to such messages are transmitted via a serial interface, for example V.24, to a data-processing system, preferably a personal computer, which processes the received data further.

Such a procedure is disadvantageous since, particularly during high-load phases in the digital telecommunications switching center, only a portion of the data recorded in the software system and relating to internal and external messages can be transmitted to the data-processing system, for further processing, via the serial V.24 interface, which normally has a data rate of 9.6 kBit/s and controls data transmission using reception of acknowledgments. This leads to a massive build-up of data in the software system, as a result of which internal resources are exhausted and, in the worst case, this causes a system crash.

SUMMARY OF THE INVENTION

An object of the invention is to provide a method for recording data about internal and external messages in a software system such that the recording of data relating to internal and external messages has no adverse effect on the system.

The principle on which the invention is based is that the data to be recorded relating to internal and external messages are transmitted to at least one buffer store and area stored there. In this case, the data transmission is carried out in such a manner that the receiver does not acknowledge receipt of the data, and the transmitter does not wait for acknowledgment of reception. The data stored in the buffer store are read only after a request from the data-processing system, for the purpose of processing them further.

The method according to the invention is distinguished in particular in that the data recorded in the software system and relating to internal and external messages are transmitted without any delay to at least one buffer store, thus avoiding a build-up of data and exhaustion of internal resources resulting from this. A further advantage is that the data-processing system can control the further processing of the data to be recorded, independently of the time at which the data have been recorded in the software system.

It has also been found to be advantageous for the data to be recorded to be transmitted to at least one buffer store immediately after they have been registered in the software system. The recording of the data is advantageously carried out by registering at least one message at at least one point defined in the software system.

In a further refinement of the invention, the data to be recorded are transmitted bit-by-bit in parallel to at least one buffer store, in order to achieve a data rate that is as high as possible.

According to one advantageous development of the invention, the buffer store is designed in such a manner that the data item stored first in the buffer store is always the first to be read again, and may then be deleted or read and then overwritten (FIFO principle).

Other advantageous refinements of the invention provide that at a specific utilization level of the buffer store, the data-processing system receives a message, and, on the other hand, that if the buffer store in the data-processing system overflows, an overflow error is reported.

In order to make it easier to store the data to be recorded in a buffer store, a data item to be recorded can be provided with a start and/or end marking.

Further refinements of the invention simplify, in particular, the identification of loss of a data item to be recorded before or during the further processing.

It has accordingly been found to be advantageous if a data item to be recorded also contains the time at which a message has been registered at a point defined in the software system.

It is also advantageous if a data item to be recorded also contains an identification number of the point which is defined in the software system and at which a message has been registered.

A further advantageous refinement of the invention provides that a subset of data, chosen by filtering, can be read from a buffer store and may be deleted. In this way, the number of data items intended for further processing can be reduced.

An exemplary embodiment of the invention is explained in more detail in the following detailed description of the preferred embodiments with reference to the accompanying drawings.

DETAILED DESCRIPTION OF THE PRESENTLY PREFERRED EMBODIMENTS

Figure 1:
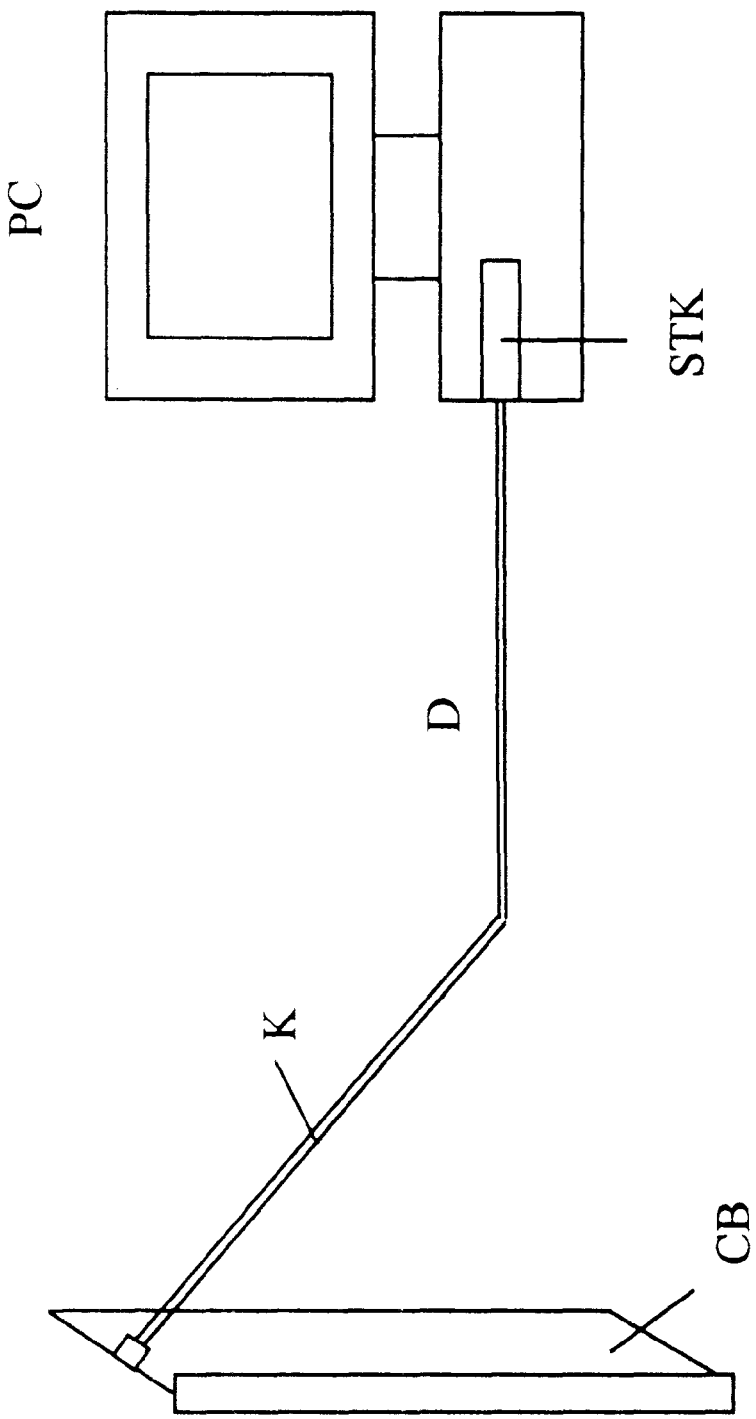
FIG. 1 shows a connection between a controller assembly CB and a personal computer PC by means of a cable K.

FIG. 1 shows that the data D to be recorded are transmitted via a cable K from a controller assembly CB to at least one buffer store ZS. One or more buffer stores are normally located on a plug-in board STK within the personal computer PC, and this plug-in board STK is connected by means of a cable K to the controller assembly. Alternatively or in addition, one or more buffer stores may be located on the controller assembly. Depending on the nature of the cable K, the data transmission is carried out in serial, parallel or optical form.

Figure 2:
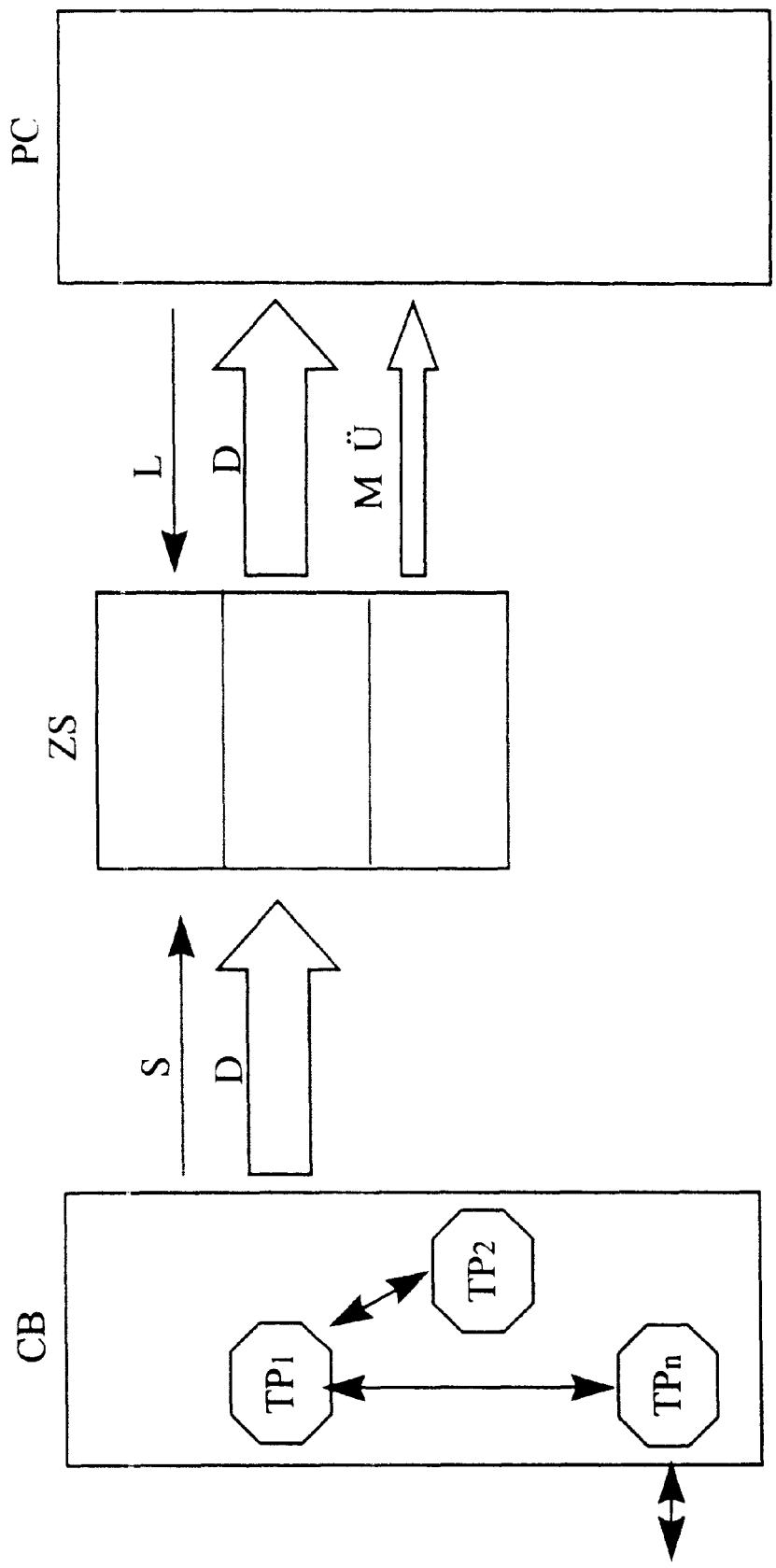
FIG. 2 shows a schematic illustration of the transmission, carried out in the manner according to the invention, of the data D to be recorded.

FIG. 2 indicates the controller assembly CB on which a stored software system can be provided, which is preferably composed of a plurality of components. These components interchange internal messages with one another and/or receive and/or transmit external messages via an interface to further assemblies which may be regarded as being located in the vicinity. Points, so-called trace points which are denoted as TP1 to TPn, are defined within the components that are present in the software system. For example, about 120 such trace points may be defined in the software system. The internal and/or external messages arriving at the trace points are registered. In FIG. 2, this response is shown by double arrows between the trace points.

Immediately after a message has been registered at at least one trace point, a data item D to be recorded relating to this message is transmitted to at least one buffer store ZS which may be regarded, as being in for example, as the personal computer PC, in FIG. 1. The data item is transmitted S to a buffer store without any delay. The receiver, that is to say the buffer store, does not acknowledge receipt of the data item. In a corresponding manner, the transmitter does not wait for acknowledgment of reception. In order that a data rate that is as high as possible can be achieved, for example of 2 MBit/s, bit-parallel transmission of the data item is preferred. In order to avoid the loss of data which may possibly occur by dispensing with acknowledgments of reception, the buffer store is chosen to be sufficiently large (for example 64 kbyte).

In order to make it possible to detect any loss of data during the further processing of the data to be recorded, an overflow error Ü is reported to the personal computer PC indicated in FIG. 2, if the buffer store overflows. In order to evaluate the data, the data item to be recorded also contains, in addition to the information relating to the messages, the time at which the message was registered at a trace point and, in addition, an identification number of the trace point at which the identification number of the trace point at which the message was registered. Furthermore, a data item to be recorded which may be, for example, several bytes long, also contains a start and end marking, for example in the form of a further bit that has been set.

The buffer store ZS indicated in FIG. 2 is designed such that the data item stored first in the buffer store is always the first to be read again and may then e deleted, or read again and then overwritten (FIFO principle).

In addition, the personal computer receives a message M at a specific utilization level of the buffer store.

The data stored in the buffer store and to be recorded can be read L, for the purpose of processing them further, at any desired time after a request from the personal computer.

In order to reduce the amount of data to be recorded and intended for further processing, a subset of said data, selected by filtering, can be read from the buffer store, and may then be deleted.

Although modifications and changes may be suggested by those skilled in the art, it is the intention of the inventors to embody within the patent warranted hereon all changes and modifications as reasonably and properly come within the scope of their contribution to the art.

What is claimed is:

1. A method for recording data relating to internal and external messages in a software system which is part of a digital telecommunications switching center, the software system including a plurality of components which transmit and/or receive external messages via at least one interface and/or which interchange internal messages between ones of the components, and the data being transmitted from the software system via an interface to a data-processing system, comprising the steps of:

registering at least one internal and/or external message at at least one trace point defined in the software system;

transmitting the data to be recorded from said at least one trace point to at least one buffer store by transmitting the at least one internal and/or external message to said at least one buffer store without any acknowledgment from said at least one buffer store of receipt of the data;

storing the data in said at least one buffer store; and reading the data stored in said at least one buffer store from said at least one buffer store to the data-processing system only after issuance of a request to read the data from the data-processing system.

2. The method according to claim 1, wherein said step of transmitting the data occurs immediately after registration of at least one message at said at least one trace point.

3. The method according to claim 1, wherein said step of transmitting the data transmits the data in parallel to said the at least one buffer store.

4. The method according to claim 1, wherein a data item stored first in said at least one buffer store is always first to be read out.

5. The method according to claim 1, further comprising the step of;

forwarding a message to the data processing system upon said at least one buffer store reaching a predetermined utilization level.

6. The method according to claim 1, further comprising the step of:

reporting an overflow error to the data-processing system upon said at least one buffer store reaching an overflow condition.

7. The method according to claim 1, further comprising the step of:

providing a start and/or end marking on the data item prior to said transmitting step.

8. The method according to claim 1, further comprising the step of:

providing time data with the data to be transmitted, said time data identifying a time when a corresponding message has been registered at the at least one trace point.

9. The method according to claim 2, further comprising the step of:

providing an identification number of the at least one trace point at which at a message has been registered with the data to be transmitted.

10. The method according to claim 1, further comprising the step of:

choosing a subset of the data stored in said at least one buffer store by filtering.

11. A method as claimed in claim 10, further comprising the step of:

reading out from said at least one buffer store said subset of data.

12. A method as claimed in claim 10, further comprising the step of:

deleting from said at least one buffer store said subset of data.

13. A method for recording internal and external data in a digital telecommunications switching center software system, the telecommunications switching center having components who's status is to be monitored, comprising the steps of:

providing trace points in the components, said trace points being defined in the software system, said trace points receiving external messages via an interface relating to external components and receiving internal messages between the components of the system, the messages relating to status of the components;

registering the external messages and the internal messages at said trace points;

transmitting the messages from said trace points to a buffer store immediately after the messages are registered at said trace points, said transmitting step being performed without forwarding of an acknowledgement of receipt of the messages by said buffer store;

storing data of the messages in said buffer store; and forwarding the data of the messages from said buffer store to a data processing system upon request of a request from said data processing system by said buffer store, the data that has been forwarded being deleted from said buffer store.

14. A method as claimed in claim 13, further comprising the steps of:

providing time stamp information and trace point identification data and start and end point data with the messages being transmitted to said buffer store.

15. A method as claimed in claim 13, further comprising the step of:

reporting utilization data of said buffer store to the data processing system.

* * * * *